United States Patent [19]
Takeuchi

[11] Patent Number: 5,721,856
[45] Date of Patent: Feb. 24, 1998

[54] OPTICAL DISK WRITE METHOD

[75] Inventor: Toshio Takeuchi, Atsugi, Japan

[73] Assignee: Mitsumi Electric Co., Ltd., Japan

[21] Appl. No.: 551,516

[22] Filed: Nov. 1, 1995

[30] Foreign Application Priority Data

Nov. 11, 1994 [JP] Japan ................... 6-278172

[51] Int. Cl.$^6$ ................... G06F 9/00; G06F 9/22
[52] U.S. Cl. ................... 395/401; 395/404; 395/427; 369/58; 369/32
[58] Field of Search ................... 369/58, 32; 312/9.1; 200/201.5; 264/1.33; 395/427, 404, 401

[56] References Cited

U.S. PATENT DOCUMENTS

| | | | |
|---|---|---|---|
| 5,210,734 | 5/1993 | Sakurai | 369/49 |
| 5,295,126 | 3/1994 | Okano et al. | 369/47 |
| 5,325,352 | 6/1994 | Matsumoto | 369/275 |
| 5,559,778 | 9/1996 | Inokuchi et al. | 369/58 |
| 5,611,066 | 3/1997 | Keele et al. | 395/427 |
| 5,617,384 | 4/1997 | Yonemitsu et al. | 369/32 |
| 5,623,470 | 4/1997 | Asthana et al. | 369/58 |

FOREIGN PATENT DOCUMENTS

| | | | |
|---|---|---|---|
| 0215133 | 3/1987 | European Pat. Off. | G11B 27/00 |
| 0275972 | 7/1988 | European Pat. Off. | G11B 7/013 |
| 0281415 | 9/1988 | European Pat. Off. | G11B 27/32 |
| 0426872 | 5/1991 | European Pat. Off. | G11B 20/12 |
| 0482645 | 4/1992 | European Pat. Off. | G11B 7/007 |
| 0552987 | 7/1993 | European Pat. Off. | G11B 19/12 |

*Primary Examiner*—Tariq R. Hafiz
*Assistant Examiner*—Than V. Nguyen
*Attorney, Agent, or Firm*—Ladas & Parry

[57] ABSTRACT

In a first step of an optical disk write method, an area for logical format information is reserved on an optical disk; in a second step, variable-length packets, each packet comprising a demarcation block and a variable-length data block including a new file or a corrected file, on a data area, in response to a write instruction for writing the new file or the corrected file; in a third step, a volume history indicating a logical structure of files is maintained and file logical information for written and deleted files is chronologically appended to the volume history; in a fourth step, logical format information of the optical disk is produced based on the volume history, in response to an instruction for finalization; and in a fifth step, the logical format information, a lead-in area and a lead-out area are provided on the optical disk.

9 Claims, 6 Drawing Sheets

OPTICAL DISK WRITE METHOD

This application claims priority from Japanese patent application No. 6-278172 filed Nov. 11, 1994. Said document is incorporated herein by reference.

BACKGROUND OF THE INVENTION

1. Field of the Invention

The present invention relates to an optical disk write method and, more particularly, to an optical disk write method for writing data on a write-once optical disk enabling writing of data, using an optical disk apparatus.

2. Description of the Prior Art

A CD-R (compact disk-recordable) disk is an optical disk of a CD format enabling writing of data in a state in which the CD-R disk is blank or the CD-R disk is not finalized yet. A CD-R disk (hereinafter, simply referred to as a disk) is a write-once optical disk which enables writing of data in a given area only once.

A write method for the disk is described in "Orange Book Part II" specifying the CD-R standards. The following write methods, based on the specified standards, are practiced in a conventional CD-R recording apparatus.

1. Disk at once

This is a method in which data is written in a lead-in area (LIA), a data area and a lead-out area (LOA) without any interval provided between the areas. According to this method, it is possible to produce a disk in which no demarcation blocks (such as a link block) are provided in the middle of the data area, similarly to the case of an audio CD available on the market in which premastered data is written. This method is used to produce a master CD disk.

2. Track at once

In this method, a series of data beginning with a two-second pregap is written as a "track", and information indicating the position of this track is written in a program memory area (PMA) preceding the LIA. The above-described process for the track is repeated a desired number of times. When it is determined that no additional tracks are to be written, data is written in the LOA and the LIA on the basis of information in the PMA. In this way, the disk is finalized.

This above-described method is mainly used when it is desired that musical tunes are written one by one on an audio disk having a CD-DA format. The same method may be used in the case of the CD-ROM. In the latter case, the number of tracks is normally set to one.

3. Session at once

Similarly to the case of the track at once method, a session is completed by writing data in the LOA and the LIA when several tracks have been written. According to this method, it is possible to produce a multi-session disk having a plurality of sessions recorded thereon.

In a multi-session recording on a data disk such as a CD-ROM, the content of a volume may be modified by writing additional sessions. For example, the multi-session recording may be applied to a photo CD.

4. Packet writing

Another method which is currently proposed is a packet writing method. In a packet writing, a track is formed by writing a plurality of packets. A packet comprises a link block, a run in block, a user data block and a run out block. The link block and the run in block disposed to precede a user data block are used as demarcations for the packet.

According to a fixed-length packet writing, the length of the user data blocks are identical to each other in a track. According to variable-length packet writing, the length of the user data block is variable in a track.

It will be noted that the disk at once method is originally used to produce a master disk from which disks are mass-produced. Since data is sequentially written in the LIA, the data area and the LOA, without any interval between the areas, addition, modification or deletion of data in units of a file are disabled in the disk at once method.

It will be further noted that the standards for the track at once method only allows a total of 99 tracks to be formed one by one. In order to produce a disk in accordance with the ISO9660 standards specifying the logical structure of the CD-ROM, it is necessary to allocate a track in an innermost area for storing logical format information. For this reason, only a total of 98 files can be stored if one file is assigned to one track. Hence, the track at once method provides too small a number of files written, considering a 600 megabyte storage space where random writing operations and file corrections (which often produce additional files) are conducted.

It will be further noted that the session at once method, like the track at once method, enables a total of 99 tracks to be formed on a disk. In order to produce a disk that conforms to the ISO9660 standards, a track that serves as an area for storing logical format information must be provided for each session. When a plurality of files are written according to a multi-session recording in which one file is assigned to one session, the number of files that can be written is even more smaller than that provided by the track at once method.

It will be further noted that by using the packet writing method, the limit to the number of files written is eliminated. However, in the fixed-length packet writing method, a file having a relatively extensive data length may reside in a plurality of packets, thus causing a CD-ROM read drive to be incapable of reading file data properly. If the user data block length becomes great, the number of useless blocks increases, and the number of files that can be written is decreased accordingly.

This brings us to the variable-length packet writing. However, no method for attaining random writing operations and corrections has been realized.

SUMMARY OF THE INVENTION

Accordingly, it is an object of the present invention to provide an optical disk write method in which the aforementioned problems are eliminated.

Another and more specific object of the present invention is to provide an optical disk write method using a packet writing method, wherein random writing operations and corrections are attained.

In order to achieve the aforementioned objects, the present invention provides an optical disk write method for writing data on a write-once optical disk according to a predetermined format, using an optical disk recording apparatus, the optical disk write method comprising the steps of:

(a) reserving an area for logical format information on the optical disk before writing user data on the optical disk;

(b) writing variable-length packets, each packet comprising a demarcation block and a variable-length data block including a new file or a corrected file, on a data area on the optical disk, in response to a write instruction for writing the new file or the corrected file;

(c) maintaining, by the optical disk recording apparatus, volume history that comprises a set of first and second file logical information of recorded files and indicates a logical structure of files on the optical disk, and appending, to the volume history, first file logical information containing information relating to write positions of the new files of the corrected files written in response to the write instruction, and second file logical information provided for a file that is deleted in response to a delete instruction;

(d) generating logical format information of the optical disk on the basis of the volume history, in response to an instruction for finalizing the optical disk; and (e) finalizing the optical disk by writing the logical format information and data for a lead-in area and a lead-out area.

According to the optical disk write method of the present invention, there is no limit to the number of files written because a target file to be written is included in a variable-length packet written on an optical disk. The volume history indicating the logical structure of the files on the optical disk is maintained by the recording apparatus until the optical disk is finalized. When the optical disk is finalized, the logical format information is written on the optical disk on the basis of the volume history. Hence, it is possible to perform, as required, writing of a new file, writing of a corrected file and deletion of a recorded file until the optical disk is finalized. The volume history has the file logical information appended thereto in the order that it is generated. Therefore, it is possible to reproduce the logical structure of the files in the past by tracing the volume history to a desired file logical information written in the past. Since the packet is configured to contain a file or files, it is possible to read files on the optical disk processed by the write system of the present invention, using an ordinary optical disk read apparatus.

In further accordance with the present invention, it is possible to perform as required creation, correction and deletion of a directory until the optical disk is finalized.

By providing an instruction for reproducing the file logical structure that was valid at a specified point of time in the past, the first file logical information, the second file logical information and the directory information that were valid up to the specified point of time are made to remain valid in the volume history. Therefore, it is easy to reproduce the file logical structure valid at a desired point of time in the past.

Provision of a volume history identification code of the present invention enables a recording apparatus to detect a volume history adapted for an optical disk. Therefore, it is possible extract an optical disk that is not finalized from an optical disk recording apparatus in the middle of a write operation so that another optical disk can be mounted on the optical disk recording apparatus and processed thereby in a write operation. In other words, it is possible to switch between a plurality of optical disks that are not finalized yet, so that the disks can be processed in parallel with each other in the write operation, using one optical disk recording apparatus.

In a preferred embodiment of the present invention, a system identification code specifying a type of write system and data indicating a zero capacity of an optical disk are written in a program memory area when the optical disk is initialized. Accordingly, a determination of a blank disk when a disk that is being processed by the write system of the present invention is mounted on an optical recording system other than the optical recording apparatus to which the present invention is applied. When an initialized optical disk is mounted on an optical disk recording apparatus to which the present invention is applied, a determination is given that the disk is being processed by the write system of the same type. Therefore, the writing operation can be resumed properly.

In further accordance with the present invention, a normal write power calibration is conducted using a power calibration area only when a period of time since the last write operation is longer than a preset time, and only when the normal power calibration is desirable. When the period of time since the last write operation is longer than the preset time, an appropriate write power is calculated on the basis of a signal restored from a file written with a write power used in the last write operation, and the calculated power is set as a write power for the next write operation. The limit to the number of times that files can be written which limit is imposed by the limit to the number of times that tests can be carried out in a power calibration area can be eliminated when it is desired that a more reliable write operation be executed by taking advantage of the write power calibration. According to this aspect of the present invention, it is possible to improve reliability and enable writing on an optical disk a desired number of times.

The aforementioned objects can also be achieved by an optical disk write method for writing data on a write-once multi-session optical disk according to a predetermined format, using an optical disk recording apparatus, the optical disk write method comprising the steps of:

(a) reserving an area for logical format information of a session, on the optical disk before writing user data in the session;

(b) writing variable-length packets, each packet comprising a demarcation block and a variable-length data block including a new file or a corrected file, on a data area on the optical disk, in response to a write instruction for writing the new file or the corrected file;

(c) maintaining, by the optical disk recording apparatus, volume history that comprises a set of first and second file logical information of recorded files and indicates a logical structure of files on the optical disk, and appending, to the volume history, first file logical information containing information relating to write positions of the new files or the corrected files written in response to the write instruction, and second file logical information provided for a file deleted in response to a delete instruction;

(d) generating logical format information of the session on the basis of the volume history, in response to an instruction for finalizing the session; and (e) finalizing the session by writing the logical format information and data for a lead-in area and a lead-out area.

According to the optical disk write method of the present invention, there is no limit to the number of files written because a target file to be written is included in a variable-length packet written on an optical disk. The volume history indicating the logical structure of the files in a session is maintained by the recording apparatus until the session is finalized. When the session is finalized, the logical format information is written in the session on the basis of the volume history. Hence, it is possible to perform, as required, writing of a new file, writing of a corrected file and deletion of a recorded file until the session is finalized. Once the session is finalized, it is possible to extract the optical disk where the finalized session is written from an optical disk recording apparatus, and mount the disk on an optical disk recording apparatus of the same type so as to execute the writing of a new session.

In accordance with another aspect of the present invention, even if the volume history on the recording apparatus is lost due to some trouble, it is possible to keep track of an accurate file structure on a current optical disk on the basis of an auxiliary volume history written on the optical disk.

In accordance with yet another aspect of the present invention, writing of a plurality of files as one packet is enabled so that the number of demarcation blocks not relevant to the user data can be reduced. Accordingly, the data area can be effectively utilized when a large quantity of data is processed.

BRIEF DESCRIPTION OF THE DRAWINGS

Other objects and further features of the present invention will be apparent from the following detailed description when read in conjunction with the accompanying drawings, in which:

FIGS. 3A and 3B explain an index β indicating whether the write power is appropriately set, FIG. 3A showing a restored EFM signal, and FIG. 3B showing a relationship between the write power and β;

DESCRIPTION OF THE PREFERRED EMBODIMENTS

Figure 1:
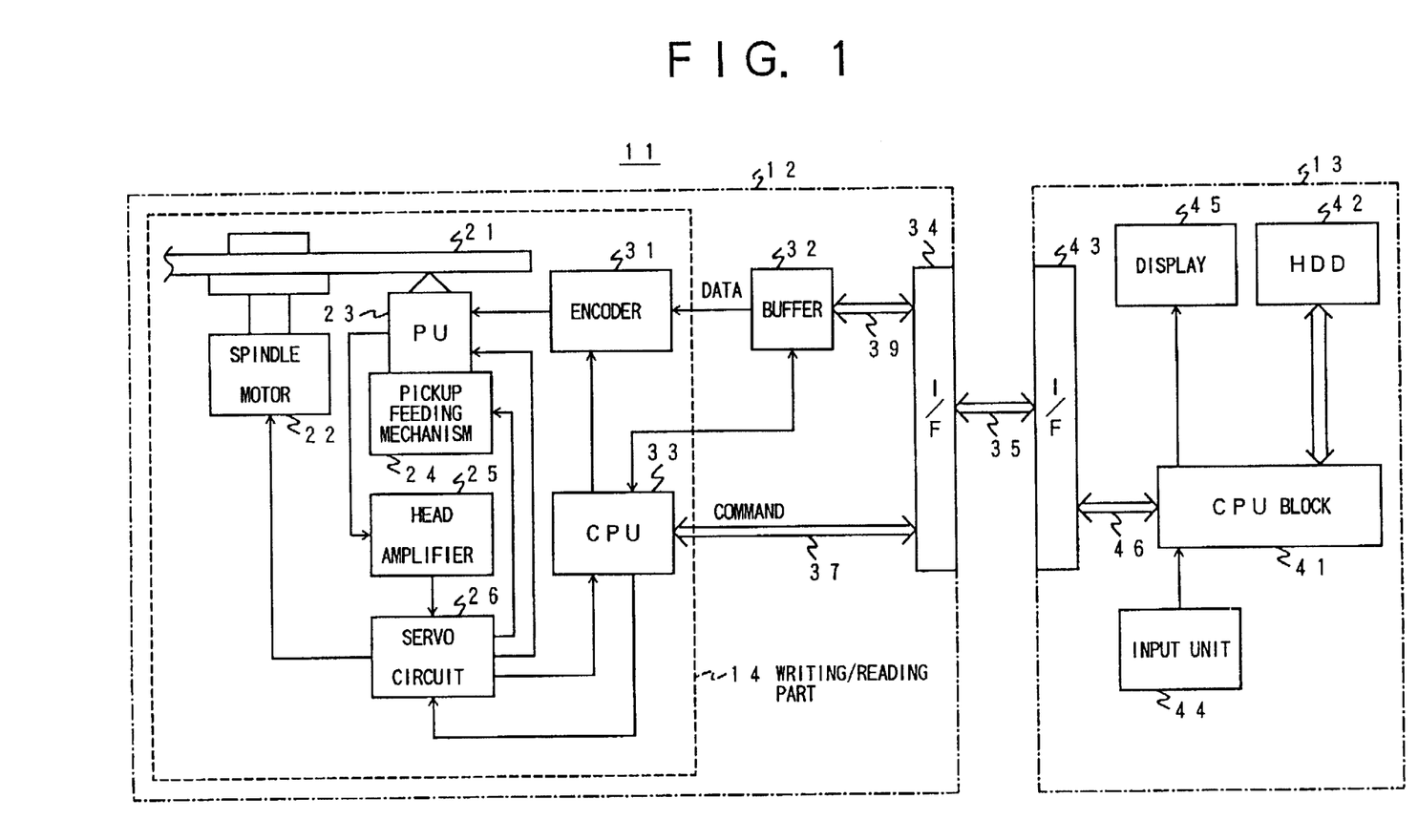
FIG. 1 shows the construction of a CD-R recording apparatus to which the optical disk write method of the embodiments of the present invention is applied.

FIG. 1 shows the construction of a CD-R recording apparatus 11 to which the optical disk write method of the embodiments of the present invention is applied. The CD-R recording apparatus (optical disk write apparatus) 11 comprises a CD-R drive (optical disk drive) 12 and a host computer 13. The CD-R drive effects data writing/reading processes on a CD-R (hereinafter, simply referred to as a disk) enabling recording of information, in accordance with a command from the host computer 13 described later.

FIG. 1 only shows parts of the CD-R drive 12 relevant to data recording process.

A writing/reading part 14 of the CD-R drive 12 comprises a spindle motor 22 for rotating a disk 21, a pickup 23 for projecting a laser beam to a target track on the disk 21 to effect information writing/reading, a pickup feeding mechanism 24 for translating the pickup 23 in a radial direction of the disk 21, and a head amplifier 25 for converting a signal restored by the pickup 23 into a signal having a predetermined level. The writing/reading part 14 also includes a servo circuit 26 for generating a wobble servo signal that controls the spindle motor 22 and controlling the position of the pickup 23, an encoder 31, and a CPU (central processing unit) serving as a controller for controlling the entirety of the CD-R drive 12.

The CD-R drive 12 has an interface circuit (hereinafter, referred to as I/F) 34 and a buffer 32.

The buffer 32 has a predetermined data storage capacity and stores data supplied thereto by the host computer 13. For example, the buffer may have a capacity of 3 megabytes. An FIFO scheme, for example, is employed in the buffer 32. According to this scheme, data is stored in the order that it is supplied from the I/F 34, and is read by the encoder 31. The encoder 31 subjects the data supplied from the buffer 32 to EFM modulation, together with subcodes, in accordance with predetermined standards, and supplies the modulated data to the pickup 23.

The CPU 33 is equipped with a ROM and a RAM. The CPU 33 is connected to the I/F 34 via a signal line 37 comprising a data bus and a control line, and to the buffer 32 via a control line. The buffer 32 is connected to the I/F 34 via a data bus 39.

Guide grooves (pregrooves) that are optically detectable are formed at track positions on the disk 21 before the disk 21 stores any data. The wobbling signal is recorded by causing an optical beam to impinge upon the grooves in a zigzag mode.

The servo circuit 26 generates a tracking signal and a focus signal on the basis of a restored signal obtained by the pickup 23 and supplied via the head amplifier 25, and supplies the tracking signal and the focus signal to the pickup 23. The servo circuit 26 also generates a wobble signal and supplies the same to the spindle motor 22. Accordingly, the pickup 23 remains aligned with the track on the disk 21 and the rotation of the disk 21 is controlled to have a constant speed with respect to the pickup 23.

The host computer 13 comprises a CPU block 41, a hard disk drive (hereinafter, referred to as a HDD) 42, an I/F 43 for implementing interface with the CD-R drive 12, a display 45, and an input unit 44.

The CPU block 41 includes a CPU, a ROM, a RAM and an interface circuit for the HDD 42, the display 45 and the input unit 44. The CPU block 41 is connected to the I/F 43 via a signal line comprising a data bus and a control line.

The I/F 43 is connected to the I/F 34 of the CD-R drive 12 via a signal line comprising a data bus and a control line. The I/F 43 and the I/F 34 have the SCSI specification. The host computer 13 may be embodied by an ordinary personal computer.

In the CPU block 41, a host system program for interfacing with a user and a write system program are executed. The write system program executing the write method of the present invention is executed under the control of the host system so as to carry out an operation of writing data on the disk 21.

Figure 2:
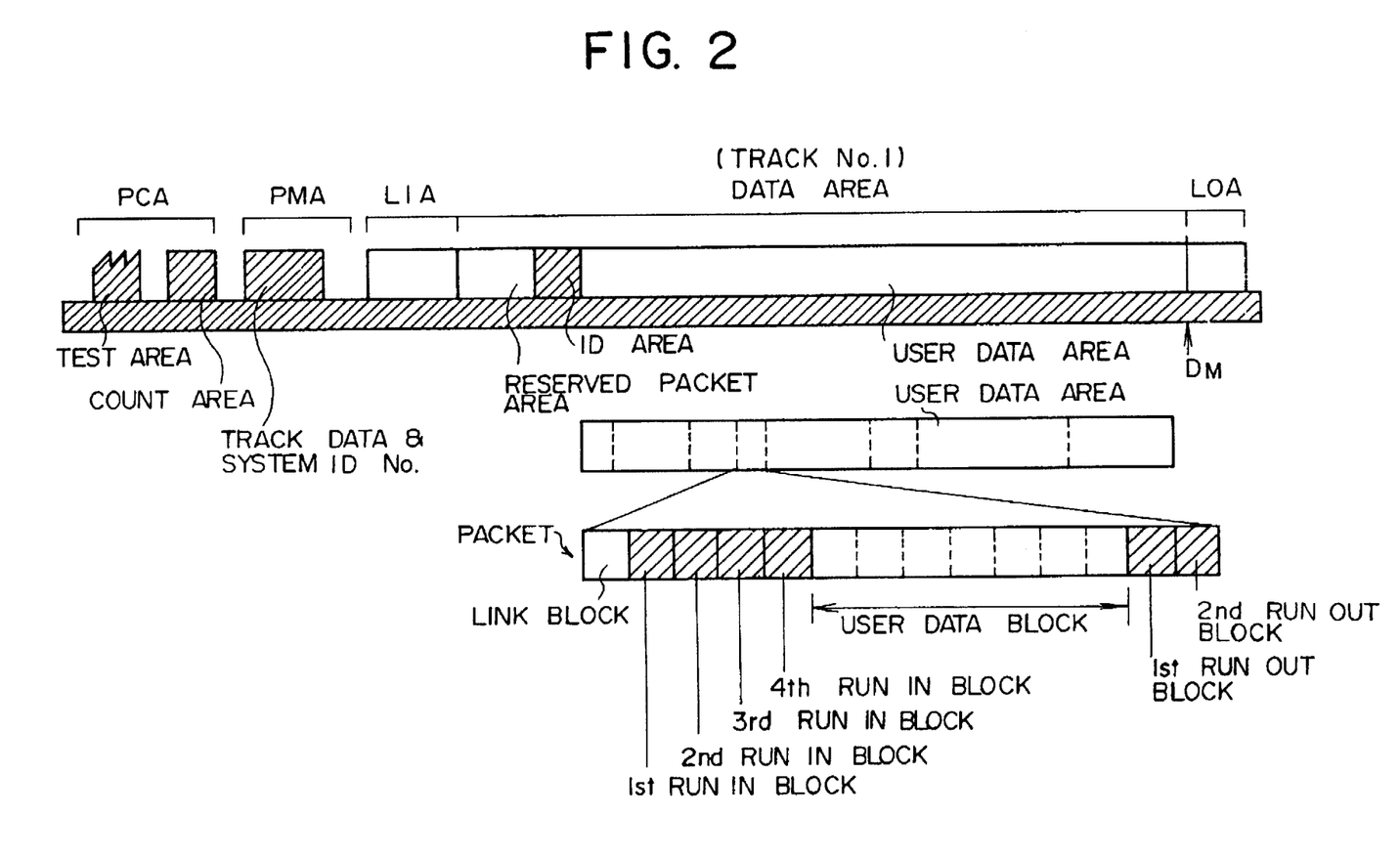
FIG. 2 shows an arrangement of data on a disk, the data being written according to the write system of the present invention.

FIG. 2 shows an arrangement of data on the disk 21, the data being written according to the write system of the present invention. The write system that implements the writing of data on the disk 21 is a program that is executed in the CPU block 41.

The disk 21 is provided with a power calibration area (PCA), a program memory area (PMA), a lead-in area (LIA), a data area and a lead-out area (LOA) in the stated order toward the periphery of the disk 21, the PCA being nearest the center.

The PCA is accessed only when data is written on the disk 21.

When the disk 21 is blank, that is, when no data is written on the disk 21, only pregrooves are formed and no data is written in the areas. ATIP data including address information is written in the pregrooves. The LIA can be found at a predetermined position. The LOA is found at varying positions on the disk 21 depending on the size of the data area. The outermost position of the data area (indicated by an arrow $D_M$ in FIG. 2) cannot be beyond an outermost address of the start position of the LOA. The outermost address of the start position of the LOA is encoded in the ATIP data in the LIA.

The data area is provided with a reserved packet area, an ID area, and a user data area. In a write operation on the disk 21, the write system writes data in these areas.

In the write system of the present embodiment, the variable-length packet writing method is employed when writing user data on the disk 21 in units of a file.

As shown in FIG. 2, a packet comprises: a user block; a link block and four run in blocks arranged to precede the user data block; and two run out blocks arranged subsequent to the user block.

The size of a block is set to predetermined value such as 2 kilobytes.

The user data block is configured to contain a minimum number of blocks capable of including a user file to be written. For this reason, the number of blocks contained in the user data block varies depending on the size of the user file. Accordingly, the length of the packet varies.

The link block is a demarcation block in which a code indicating a demarcation is registered in a subcode in a 26th frame among 98 frames in a block. The four run in blocks and the two run out blocks are provided to adapt for dispersion of data when the data is interleaved in a coding process. No data is written in the run in blocks. The four run out blocks also have a function of providing a time that ensures proper synchronization after a demarcation provided by the link block is detected in a data read operation.

In some cases, a plurality of user files may be written in a packet.

By using the variable-length packet writing method, the limit to the number of files that can be written is eliminated. Further, it is possible to write an inseparable file using a minimum number of blocks.

The logical format information indicating the logical structure of the files written on the disk 21 is written in the reserved packet area in a finalization process, on the basis of the volume history described later. The logical format information is in accordance with the ISO9660 standards. In a two-second pregap at the head of the reserved packet area, a track descriptor block is provided. The track descriptor block contains written thereinto the type of the disk (CD-ROM, CD-I, CD-ROMXA etc.), information indicating whether or not the packet writing method is used, and information indicating whether the fixed-length packet or the variable-length packet is used. The reserved packet area is reserved as an area containing a predetermined number of blocks at the start of a data write operation.

During the write operation on the disk 21, that is, before the disk 21 is finalized, the write system maintains, in the storage apparatus (for example, the HDD 42) of the host computer 13, a file for the volume history indicating the logical structure of the files written on the disk 21 up to a given moment.

The volume history stores the logical information of the files indicating recording positions (write addresses) of the files, in the event that the writing of a new file on the disk 21, the writing of a corrected file in place of a file already written on the disk 21, deletion (invalidation) of a file already written, or the like occurs.

By referring to the file logical information in the volume history in the order that the information is written, the current volume content of the disk 21, that is the current file structure on the disk 21 can be determined.

The writing of a new file, the writing of a corrected file, deletion of a file already written are conducted with respect to a directory specified by a command issued to the write system. A directory-related change (creation, correction or deletion of a directory) not involving a change in any file may be performed.

Therefore, the volume history includes information relating to directories. For example, the volume history maintains a history of information relating to the directory structure and information relating to the correspondence between the directories and the files, in addition to the file logical information which relates to the files.

The file logical information generated in the event of a new recording, correction or deletion includes, for example, file identification data (for example, a file number), a file head address on the disk 21 (start address of the user data block), a data length, information indicating a new recording, correction or deletion, and a process time/date.

The logical format information indicating the logical structure of the files written on the disk 21 is written in the reserved packet area in a finalization process, on the basis of the volume history.

As has been described, according to the present embodiment, the volume history is maintained in the HDD 42 until the disk 21 is finalized. When the disk 21 is finalized, the logical format information is written in the reserved packet area on the disk 21 on the basis of the volume history. Therefore, it is possible to perform, as required, writing of a new file, writing of a corrected file, deletion of a recorded file, creation of a directory, correction of a directory, and deletion of a directory, until the disk 21 is finalized.

The volume history keeps a chronological record of file logical information and directory information, the file logical information relating to a record of new recordings of a file, corrections of a file and deletions of file, and directory information relating to creations of a directory, corrections of a directory and deletions of a directory. Therefore, by referring to the content of the volume history maintained up to a certain point of time in the past, it is easy to reproduce the state of the file logical structure of the disk 21 in the past. Hence, it is possible to-made the write system better protected against deletion of data caused by an erroneous operation or an alteration by a third person.

The volume history 42 is written in the HDD 42 from time to time as a temporary file in order to prevent the volume history from being lost due to an unexpected event such as a power down or a hangup.

An IDNo. (volume history identification code) indicating correspondence between the volume history maintained by the host computer 13 and the disk 21 is written in the ID area when the disk 21 is initialized. The IDNo. is data (for example, a name of the volume history) for specifying the volume history for a given disk.

The ID area is formed by a packet comprising a total of eight blocks; a link block, four run in blocks, a IDNo. block, and two run out blocks.

Since the IDNo. registers correspondence between the disk 21 and the volume history, it is possible to extract the disk 21 that is not finalized yet from the CD-R drive 12 and resume writing on the same disk 21 by mounting the same on the CD-R drive 12. Therefore, it is possible to write on a plurality of disks 21 that are not finalized yet, using a single CD-R recording apparatus 11.

When the disk 21 is initialized, a system IDNo. (system identification code) indicating the type of the write system and track data for preventing writing by a write system other than the write system of the present embodiment is written by the write system in the PMA.

If the disk 21 that is being processed by the write system of the present embodiment is read by another write system, a determination that the disk is blank is yielded, when no data is written in the PMA. This happens because there is no data in the LIA, either. Consequently, data may be accidentally written on the disk.

In order to prevent a determination of a blank disk, track data whose track No. 1 starts at a 0-minute-2-second-0 block and ends at a point at which the LOA starts when the LOA has a maximum size is written in the PMA when the disk 21 is initialized. With this arrangement, a write system other than the write system of the present embodiment determines that it is impossible to write on the disk 21 because the capacity thereof is dissipated. In this way, writing by a write system other than that provided by the present embodiment is prevented.

According to the write system of the present embodiment, it is possible to determine before a finalization that the write system is in the process of writing on the disk 21, if data is absent in the LIA and track data is present in the PMA.

The system IDNo. identifies the write system responsible for the writing on the disk 21. According to the Orange Book specification, a disk identification code may be written in a MIN, SEC, BLOCK for the ADR 2 of the PMA as a six-digit BCD code. Therefore, the IDNo. of the present embodiment is written in the above-mentioned block.

A code identifying the format of the disk 21 (CD-ROM, CD-I, CD-ROMXA etc.) may be written in a PSEC in the subcode.

The PCA is an area provided for a power calibration and includes a test area and a count area.

According to the write system of the present embodiment, variable-length packets are written in units of a file. Therefore, power calibration is ideally conducted each time a file is written. However, only a total of ninety-nine times of PCA testing is permitted in the standards.

According to the write system of the present embodiment, write power is appropriately set in the following manner.

When the disk 21 experiences a writing operation for the first time, a normal power calibration is conducted immediately before the writing operation. For the subsequent writing operation, a normal calibration is conducted immediately before the writing operation only if a period of time that elapsed since the last writing operation is longer than a preset time. When an interval since the last writing operation is shorter than the preset time, writing is performed with a power used in the previous writing operation, whereupon a new write power is calculated and set on the basis of a restored signal.

Figure 3A:
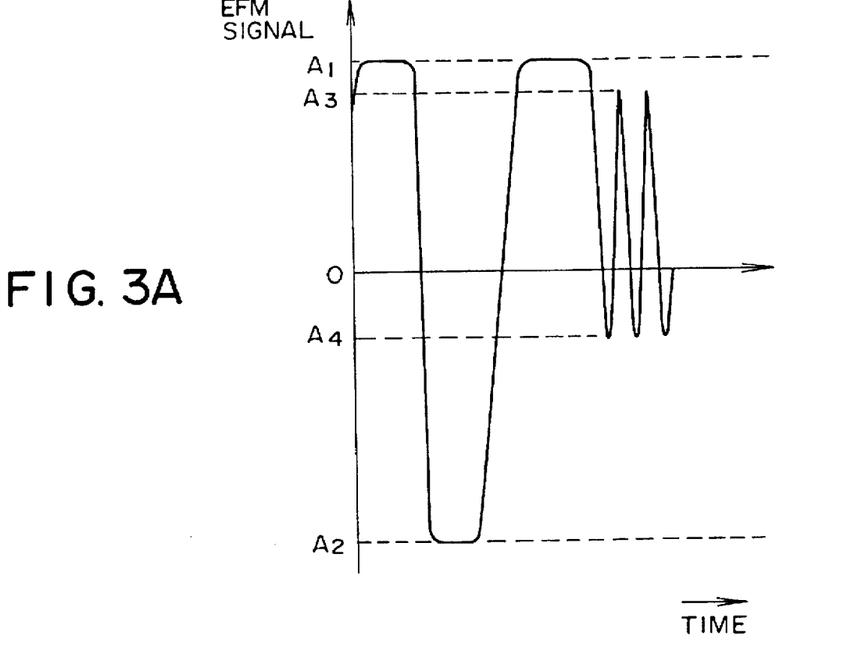
Figure 3B:
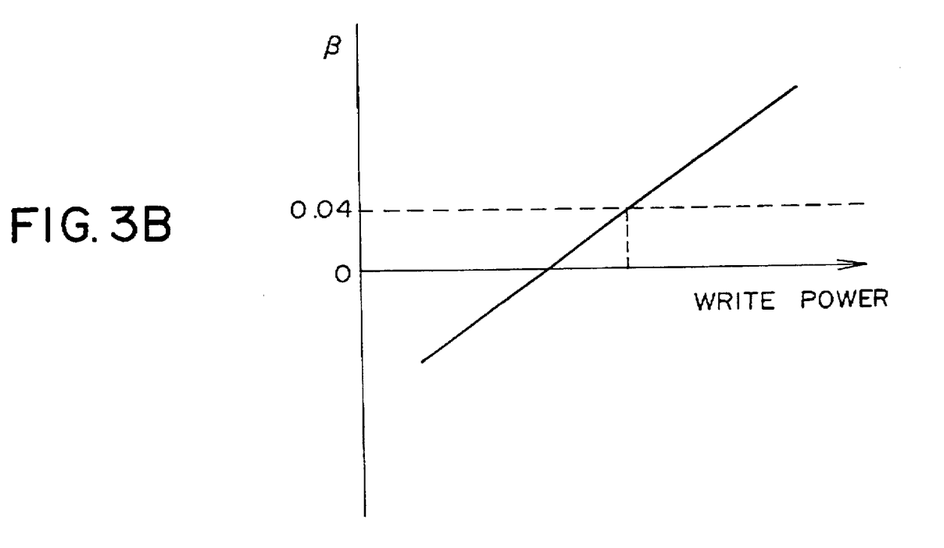

FIGS. 3A and 3B explain an index $\beta$ indicating whether the write power is appropriately set. FIG. 3A shows a restored EFM signal. $\beta$ indicates asymmetry of the restored signal and can be given by the following equation (1).

$$\beta = (A_3 + A_4)/(A_1 A_2) \qquad (1)$$

where $A_1$ and $A_2$ indicate positive and negative peak values, respectively, of a maximum-amplitude component in the restored EFM signal, and $A_3$ and $A_4$ indicate positive and negative peak values, respectively, of a minimum-amplitude component of the EFM signal.

FIG. 3B shows a relationship between the write power and $\beta$. As shown in FIG. 3B, the write power and $\beta$ vary substantially linearly with respect to each other.

In a normal calibration, random EFM data is written in the test area using several different levels of write power. Calculation of $\beta$ of the restored EFM signal is made according to the equation (1) so as to obtain a write power that provides the most appropriate value of $\beta$. The write power that provides the most appropriate value of $\beta$ is set as the most appropriate write power. Normally, the write power that provides $\beta = 0.04$ is set as the most appropriate write power.

In a normal calibration, the relationship as shown in FIG. 3B between the write power and $\beta$ is obtained, and the gradient of the line is calculated.

Each time a normal calibration is executed, one block of data is written in the count area.

When an interval since the last writing operation is shorter than the preset time, a normal calibration is not carried out. A variable-length packet of a target file is written with the write power used in the previous writing operation. Subsequently, the write power for the subsequent operations is set in the following manner.

The file written by the power used in the previous writing operation is read, whereupon calculation of $\beta$ of the EFM signal is made according to the equation (1). A calculation is then made of an offset of the obtained $\beta$ value from 0.04. Variation of the write power that corresponds to this offset is calculated on the basis of the gradient, obtained in the normal calibration, of the line indicating the relationship between the write power and $\beta$. The calculated power variation is subtracted from the current write power so that $\beta$ has the value of 0.04, and the resultant value is set as the write power for the next writing operation.

Figure 4:
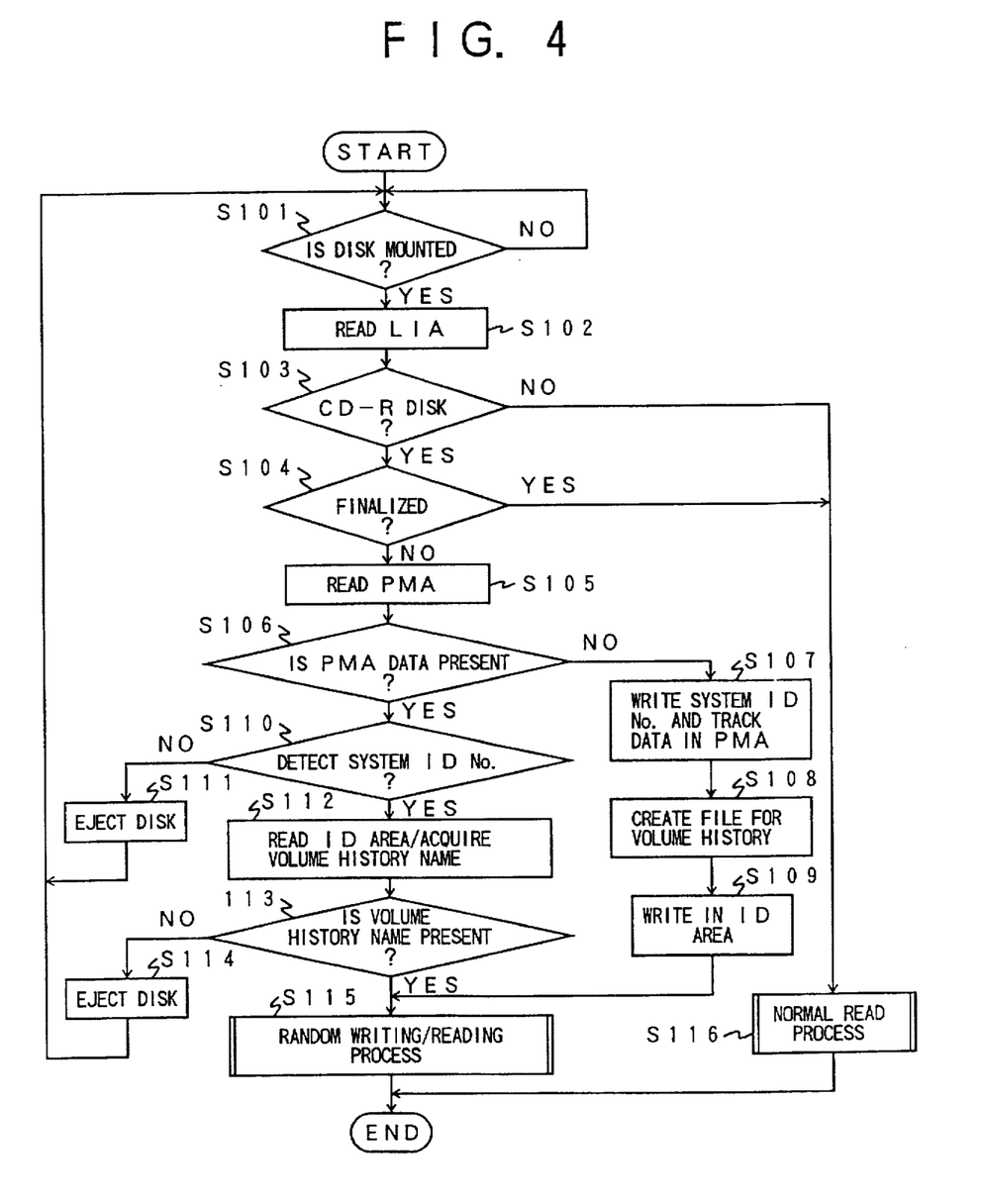
FIGS. 4 is a flowchart showing a procedure of writing on the disk according to the write system of the present invention.

A description will now be given of a procedure of writing on the disk 21 according to the write system of the present embodiment. FIG. 4 is a flowchart showing a procedure of writing on the disk 21 according to the write system of the present embodiment.

The host system and the write system of the present embodiment are executed on the CPU block 41 of the host computer 13.

An user of the CD-R recording apparatus 11 performs various tasks including creation, correction and deletion of a user file on the host system.

The host system maintains the user file on the HDD 42 until the user completes a task. When the user completes the task, the host system issues a command responsive to the user task to the write system.

The command issued to the write system include commands for writing of a new file, writing of a corrected file, deletion of a written file, creation, correction and deletion of a directory, reproduction of the volume history, a termination of an operation, and finalization of the disk. Commands instructing a file to be written includes specification of a directory.

The write system executes writing of a new file on the disk 21, writing of a corrected file, or appending of data to the volume history in accordance with a command provided by the host system.

When the power of the CD-R recording apparatus 11 is ON, the write system starts an initialization in step 101. In step 101, a determination is made as to whether or not the disk 21 is mounted on the CD-R drive 12. If the disk 21 is mounted, the control is turned over to step 102, where the LIA on the disk 21 is read.

In step 103, a signal restored from the LIA is referred to in order to detect pregrooves. When the pregrooves are detected, it is determined that the disk mounted is a CD-R disk.

When the pregrooves are not detected, it is determined that the disk is not a CD-R disk. The control is then turned over to step 116, where a normal reading process for a completed CD is performed.

When the pregrooves are found, it is determined that a CD-R disk is mounted, and the control is turned over to step 104. In step 104, a determination is made as to whether or not data is written in the LIA so as to determine whether or not the disk 21 if finalized.

If the disk 21 is finalized, the control is turned over to step 116, where a normal reading process is carried out. If the disk 21 is not finalized, the control is turned over to step 105, where the PMA is read.

In step 106 (eighth step), a determination is made as to whether or not track data (written in step 107) is written in the PMA. If no track data is written in the PMA, it is determined that the disk 21 is blank, whereupon the control is turned over to step 107.

In step 107 (seventh step), a system IDNo. identifying the write system and track data are written in the PMA. The track data written in step 107 is track data in which the track No. 1 starts at a 0-minute-2-second-0 block (start address) and ends at an outer most address (end address) of the start position of the LOA. By writing the track data, a write system other than the system of the present embodiment yields a determination that the capacity of the disk 21 is dissipated so that writing operation is disabled. In this way, writing by a write system other than that provided by the present embodiment is prevented.

Before the writing process in step 107, a normal power calibration is performed so that the write power is set to an appropriate level.

In step 108, a file for the volume history of the disk 21 is created on the HDD 42 of the host computer 13. The volume history is provided with a volume history name for identification. At this stage, the volume history contains no data.

In step 109 (first step and sixth step), the reserved packet area in which the logical format information is written is reserved in the data area on the disk 21. The IDNo. (volume history identification code) identifying the name of the volume history of which a file is created in step 108 is written in the ID area subsequent to the reserved packet area. With this arrangement, correspondence between the disk 21 and the volume history on the host computer 13 can be properly established.

After step 109, a random writing/reading process on the disk 21 is carried out in step 115.

If it is determined in step 106 that no data is written in the PMA, a determination is made that the disk 21 has not yet been finalized and the write system is in the process of writing on the write disk, whereupon the control is turned over to step 110. In step 110, the write system searches the PMA for the system IDNo. If system IDNo. cannot be detected, a determination is made that the disk 21 is not processed by the write system of the present embodiment, whereupon the control is turned over to step 111, where the disk 21 is ejected. The control is returned to step 101.

If the system IDNo. is detected in step 110, a determination is made that the disk 21 is being processed by the write system of the present embodiment, whereupon the control is turned over to step 112, where the ID area in the data area is read so as to acquire the volume history name.

In step 113, a determination is made as to whether the volume history name resides on the host computer 13. If the volume history name is not found on the host computer 13, a determination is made that the disk 21 is not being processed by the write system of the present embodiment, and the control is turned over to step 114. In step 114, the disk 21 is ejected, whereupon the control is returned to step 101.

If the volume history name is found on the host computer 13 in step 113, a determination is made that the disk 21 is being processed by the write system of the present embodiment, whereupon the control is turned over to step 115. In step 115, random writing/reading process in the disk 21 is carried out.

Figure 5:
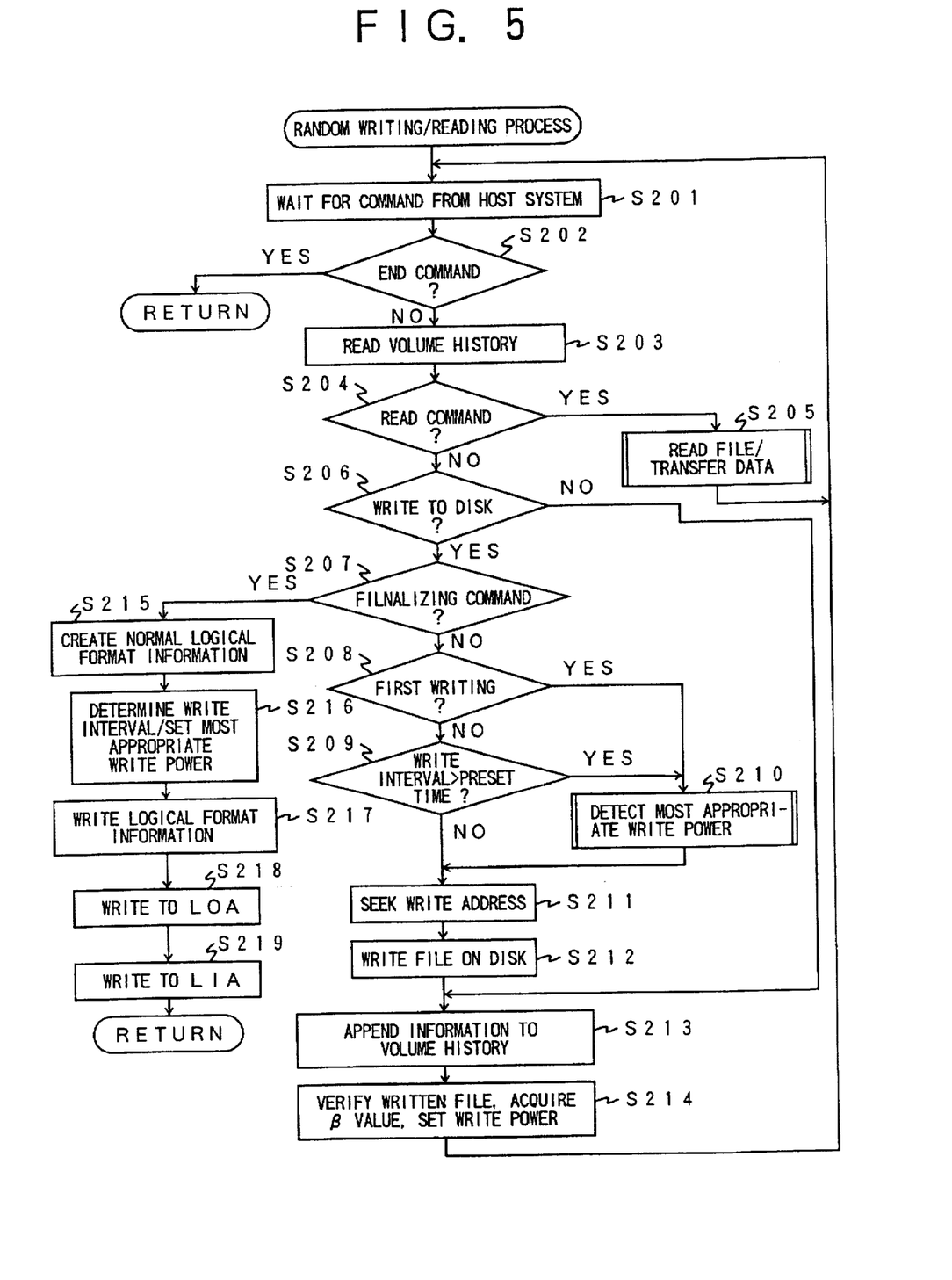
FIG. 5 is a flowchart showing a procedure of random writing/reading process of a step of FIG. 4.

FIG. 5 is a flowchart showing a procedure of random writing/reading process of step 115 of FIG. 4.

In step 201, the write system waits for a command from the host system. When a command is provided, the control is turned over to step 202, whereupon the process is terminated if the command provided is an end command. If the command provided is other than an end command, the control is turned over to step 203.

In step 203, the file for the volume history having the volume history name acquired in step 112 of FIG. 4 is retrieved from the HDD 42.

In step 204, a determination is made as to whether or not the command provided is a read command. If an affirmative answer is yielded in step 204, the control is turned over to step 205, where the file specified by the command is read from the disk 21, and data is transferred to the host system. The file is read such that the file logical information, the information relating to the directory structure, and information relating to correspondence between the directories and the files are referred to in the volume history so that the address for the specified file on the disk 21 is obtained. After the process of step 205, the control is returned to step 201, where the write system waits for a command again.

If it is determined that the command provided is not a read command, a determination is made in step 206 whether or not the command provided is a command for writing on the disk 21. If the command provided is a command instructing writing on the disk 21, that is, if the command is for writing a new file, writing a corrected file, or finalizing the disk 21, the control is turned over to step 207.

In step 207, a determination is made as to whether or not the command provided is a finalizing command. If a negative answer is yielded in step 207, the control is turned over to step 208. In steps 208–214, the file specified by the command is written in the disk 21, and information is appended to the volume history in association with the writing of the file.

In step 208, a determination is made as to whether or not the disk 21 experiences a writing operation for the first time. If an affirmative answer is yielded in step 208, the control is turned over to step 210. In step 210 (tenth step), a normal power calibration, in which writing is carried out in the PCA with a plurality of power levels, is executed, thereby detecting the most appropriate write power that attains $\beta=0.04$. One new block of data is written in the count area. In this process, the mathematical relationship between the write power and $\beta$ is obtained and the gradient of the line indicating the relationship is obtained. After step 110, the control is turned over to step 211.

If a negative answer is yielded in step 208, the control is turned over to step 209 (ninth step), where a period of time that elapsed since the last writing operation is compared with a preset time. If an interval since the last writing operation is longer than the preset time, the control is turned over to step 210, whereupon a normal power calibration is carried out.

If it is determined in step 209 that the interval since the last writing operation is shorter than the preset time, the normal power calibration is not carried out and the control is turned over to step 211.

In steps 211 and 212 (second step), a write process for writing a file on the disk 21 is executed. In step 211, a write address at which the file is appended is obtained from the file logical information in the volume history. More specifically, the write address can be determined from the start address of the last appended file and the data length thereof.

Further, the number of blocks that constitute a variable-length packet for the new or corrected file specified by the write command is determined.

The write system feeds a command for writing the variable-length packet having the total number of blocks determined as described above, to the CD-R drive 12, the writing starting at the write address determined as described above. A data write command for the CD-R drive 12 is supplied to the CPU 33 of the CD-R drive 12 via the I/Fs 43 and 34.

The CPU 33 of the CD-R drive 12 issues an instruction to the servo circuit 26 in accordance with the data write command from the host computer 13 so as to initiate a seek operation for translating the pickup 23 to the specified address. Shortly before the seek operation is completed, the CPU 33 returns a signal that the seek operation is completed to the host computer 13 via the I/F 34.

In step 212, the following process is executed so as to write the specified file in the disk 21 as a variable-length packet.

The write system monitors a signal indicating that the seek operation is completed. If the signal indicating the completion of the seek operation has been provided by the CD-R drive 12, that is, if a seek operation completion status has been attained, a packet is constructed from the specified file and the packet is transferred to the CD-R drive 12.

More specifically, a link block and four run in blocks at the head of the packet are transferred first. Subsequently, the specified file stored in the HDD 42 is read and the user data block containing the data for the file is transferred. Thereafter, two run in blocks are transferred.

A subcode and a block header comprising a sync signal, a block address and the like are generated for each block. Each of the blocks are transferred in a state in which the block header is attached to the block. The subcode is transferred each time a block is transferred.

Each block of the packet transferred to the CD-R drive 12 is fed to the buffer 32 via the I/F 34. The blocks are sequentially stored in an empty area of the buffer 32.

Upon completion of the seek operation, the CPU 33 of the CD-R drive 12 issues a command to start a writing operation to the encoder 31.

Upon receiving the command to start a writing operation from the CPU 33, the encoder 31 reads data in units of a block from the buffer 32 and modulates the read data together with the subcodes for respective blocks so as to produce modulated data. The encoder 31 attaches a frame sync signal at each 588 channel bit interval and feeds the resultant data to the pickup 23.

The packet constructed from the specified file is written on the disk 21, starting at an address subsequent to a previously written packet. After the file is written in step 212, the control is turned over to step 213.

If it is determined that the command provided by the host system is not a command for writing on the disk 21, the control is turned over to step 213. The command that is not for writing on the disk 21 may be a command for deletion of a file or creation, correction or deletion of a directory, or may be a reproduction command.

In step 213, information is appended to the volume history in the event that a command that does not evoke the writing operation in step 212 is issued.

If the file is written in the disk 21 in step 212, the file logical information of the written file is appended to the volume history. As has been described previously, the file logical information includes, for example, file identification data, a file head address on the disk 21 (start address of the user data block), a data length, information indicating a new recording or a correction, and a process time/date. Information that specifies correspondence between the written file and a specified directory is added to the volume history.

In case of a deletion command, the file logical information of the file to be deleted (invalidated) is added to the volume history. The file logical information includes, for example, file identification data, a file head address on the disk 21, a data length, information indicating deletion, and a process time/date.

In case of a command for creation, correction or deletion of a directory, directory structure information corresponding to the command is added to the volume history. For example, in case of a command for creating a directory, the name of a parent directory and the name of a new directory are added to the volume history as directory structure information.

In case of a reproduction command, that part of the information in the volume history which was valid before the date and time specified by the reproduction command is validated, and the data added after the specified date and time is invalidated.

After the reproduction command is received, information valid up to the specified date and time, in conjunction with the information added in response to subsequent commands, constitute the volume history.

After the process of step 113, the control is turned over to step 114 (eleventh step), where the file written in step 112 is restored and verified. If there is a data error, the same file is newly written on the disk 21, and associated file logical information is added to the volume history. In parallel with the verification, the value of β is acquired to correct the write power such that β=0.04 is attained. The corrected write power thus obtained is set as the most appropriate write power for a next write operation. After step 114, the control is returned to step 201, and the write system waits for a next command.

If it is determined that the command provided by the host system is a finalizing command, the control is turned over to step 215. In steps 215–219, a process relating to the finalizing is executed.

In step 215 (fourth step), file logical information, directory structure information, information specifying correspondence between the directories and the files are integrated along a time line so that a normal logical format information that conforms to the ISO9660 standards is created.

The logical format information comprises a volume descriptor, a directory record, a file record and a path table.

The volume descriptor comprises a position (block address) of the path table and a directory record for a root directory.

The directory record for a root directory stores pointers indicating positions (block addresses) of subdirectories and files that can be found in the root directory, and a data length of the files.

The directory record is provided for each subdirectory and stores pointers indicating positions (block addresses) of subdirectories and files that can be found in the subdirectory, and a data length of the files.

The file record stores pointers indicating positions (block addresses) of files, and a data length of the files.

The path table is provided so that the pickup is able to arrive at any given directory in one seek operation. The path table relates to subdirectories and stores the name of directories and positions (block addresses) of the directories.

In step 216, a period of time that elapsed since the last writing operation is determined. If an interval since the last writing operation is longer than a preset time, a normal power calibration is executed as is done in step 210, so that the most appropriate write power is determined. If the interval since the last writing operation is shorter than the preset time, the write power used in the last write operation continues to be set as the write power.

In steps 217–219 (fifth step), the disk 21 is finalized. In step 217, the logical format information created in step 215 is written in the reserved packet area reserved on the disk 21. More specifically, a packet is constructed from the logical format information. A command instructing the CD-R drive 12 to write the packet on the disk 21, starting at the head of the reserved packet area (0-minute-0-second-0 block), is provided to the CD-R drive 12. The packet for the logical format information is transferred to the CD-R drive 12. In this way, the packet for the logical format information is written in the reserved packet area.

In step 218 that follows, a code indicating the LOA is written in the LOA. Subsequently, in step 219, a TOC is written in the LIA. The TOC contains data indicating a start position (0-minute-2-second-0 block) and an end position of the track 1 constituting the data area, data indicating the type of the disk (CD-ROM, CD-ROMXA, CD-I etc.), data indicating the single session, and the like. When the process of step 219 is completed, the finalizing process is completed.

As has been described, the present embodiment ensures that an area for the logical format information is reserved as a reserved packet area. The volume history is maintained on the HDD 42 until the disk 21 is finalized. When the disk 21 is finalized, the logical information derived from the volume history is written in the reserved packet area on the disk 21. Therefore, it is possible to perform, as required, writing of a new file, writing of a corrected file, deletion of a recorded file, creation of a directory, correction of a directory, and deletion of a directory, until the disk 21 is finalized.

Thanks to the IDNo. that indicates correspondence between the disk 21 and the volume history, it is possible to switch between a plurality of disks 21 that are not finalized yet so that the disks 21 can be processed in parallel with each other in the write operation.

By referring to the volume history so as to determine the content that was valid up to a point of time specified by a reproduction command, it is easy to reproduce the state of the file logical structure on the disk 21 valid at the specified point of time. Hence, it is possible to made the write system better protected against deletion of data caused by an erroneous operation or an alteration by a third person.

In the above-described embodiment, it is possible to extract the disk 21 from the CD-R recording apparatus while the disk 21 is being processed in the write operation. However, it is assumed that the disk 21 is processed in the write operation by the same CD-R recording apparatus 11 which maintains its volume history through the end of the finalization.

In a state where the logical format information is not written in the reserved packet area yet, the disk 21 extracted from a first CD-R recording apparatus 11 cannot be processed either in a write operation or in a read operation by a second CD-R recording apparatus 11 which has the same write system but has not processed the disk 21, because the second CD-R recording apparatus 11 does not maintain a file for the volume history of the disk 21.

In one approach to resolve this inconvenience, the present invention provides variations of the write method that employ multi-session recording. The procedure of the write system of a first variation is virtually the same as the procedure shown in FIGS. 4 and 5 referred to in the foregoing embodiment, a difference from the foregoing embodiment being that the volume history is not maintained for the entirety of the disk 21 and used in the write operation. A plurality of volume histories each associated with respective sessions on the disk 21 are maintained and used in the write operation.

When it is required that the disk 21 that is being processed in the write operation be extracted from a first CD-R recording apparatus 11 and continue to be processed by a second CD-R recording apparatus 11, the user issues an instruction to finalize the current session to the write system. The write system that received the instruction to finalize the session turns the disk into a multi-session disk and finalizes the current session. More specifically, the write system produces the logical format information based on the volume history of the finalized session (fourteenth step) and then writes the logical format information at the head of the data area as part of the finalization process. The write system then writes a start address and an end address of the track for the finalized session, in the PMA and in the LIA for the finalized session. The LOA is provided subsequent to the data area for the finalized session. A code indicating the multi-session is written in the LIA (fifteenth step).

The system IDNo. is written in the PMA, and the volume history is written in the ID area.

A case is now assumed where the disk 21 that is extracted from a first CD-R recording apparatus 11 after a first session is finalized is mounted on a second CD-R recording apparatus 11 having the same write system. In this case, the write system of the second CD-R recording apparatus 11 recognizes that the disk 21 mounted has been processed by the write system of the same type, based on the system IDNo. The write system of the second CD-R recording apparatus 11 also recognizes that the first session of the multi-session is finalized. The write system then searches for the LIA of the second session.

Since the disk 21 that is extracted after the first session is finalized does not have any data relating to subsequent sessions including the second session, the write system determines that the LIA for subsequent sessions including the second session is not present.

An initialization is then carried out in order to enable data relating to subsequent sessions to be written. More specifically, the host computer 13 creates a file for the volume history that corresponds to the second session. Next, the LIA and the reserved packet area for the second session are reserved (eleventh step) and the name of the volume history is written in the ID area.

Thereafter, as in the case of the foregoing embodiment shown in FIG. 5, it is possible to append information to the volume history for the second session (thirteenth step) in response to the writing of a new or corrected file (twelfth step), deletion of a file, or creation, correction or deletion of a directory.

The initialization, the writing of data, the appending of information to the volume history and the finalization process are executed in the same manner for each session.

When it is desired that the disk 21 is extracted in the middle of a session and continue to be processed in the same CD-R recording apparatus 11 in the write operation, the user does not issue a command for finalization of the session before extracting the disk 21. Instead, the user issues an end command.

In the above-described case, the write system does not finalize the current session. Instead, the write system causes the disk 21 to be ejected while maintaining the volume history for the currently processed session the host computer 13.

When the disk 21 is extracted in the middle of a session and mounted again on the same CD-R recording apparatus 11 that has processed the disk 21, the write system of the CD-R recording apparatus 11 tries to detect a session that has not yet been finalized in a search operation. Since the ID area for the session not finalized contains the volume history name, it is possible to find the volume history file for the session on the host computer 13, based on the volume history name.

On the basis of the volume history thus found, it is possible to resume the session.

If the disk 21 is extracted in the middle of a session and then mounted on a different CD-R recording apparatus 11, the write system of the different CD-R recording apparatus 11 does not write anything and ejects the disk 21 because the volume history name written in the ID area of the disk 21 is not found on the host computer 13.

If the disk 21 in which the session is finalized is mounted on a CD-R recording apparatus having the write system, other than the write system of the present embodiment, adapted for multi-session recording, the write system other than that of the present embodiment is capable of effecting writing of a new file, and correction or deletion of a file in the sessions on the disk 21.

The write system adapted for multi-session recording includes a photo CD write system in which the logical format information is updated for each session.

Finalized sessions on the extracted disk 21 can be read using a normal CD-ROM read apparatus.

As has been described above, the first variation enables writing of a new file, writing of a corrected file, deletion of a written file, creation, correction and deletion of a directory to be carried out as required in each session.

Once a session is finalized, the disk 21 can be extracted from the CD-R recording apparatus 11 that processed the writing of the session and mounted on another CD-R recording apparatus 11 having a write system of the same type, so that the writing of a new session can be performed.

Figure 6:
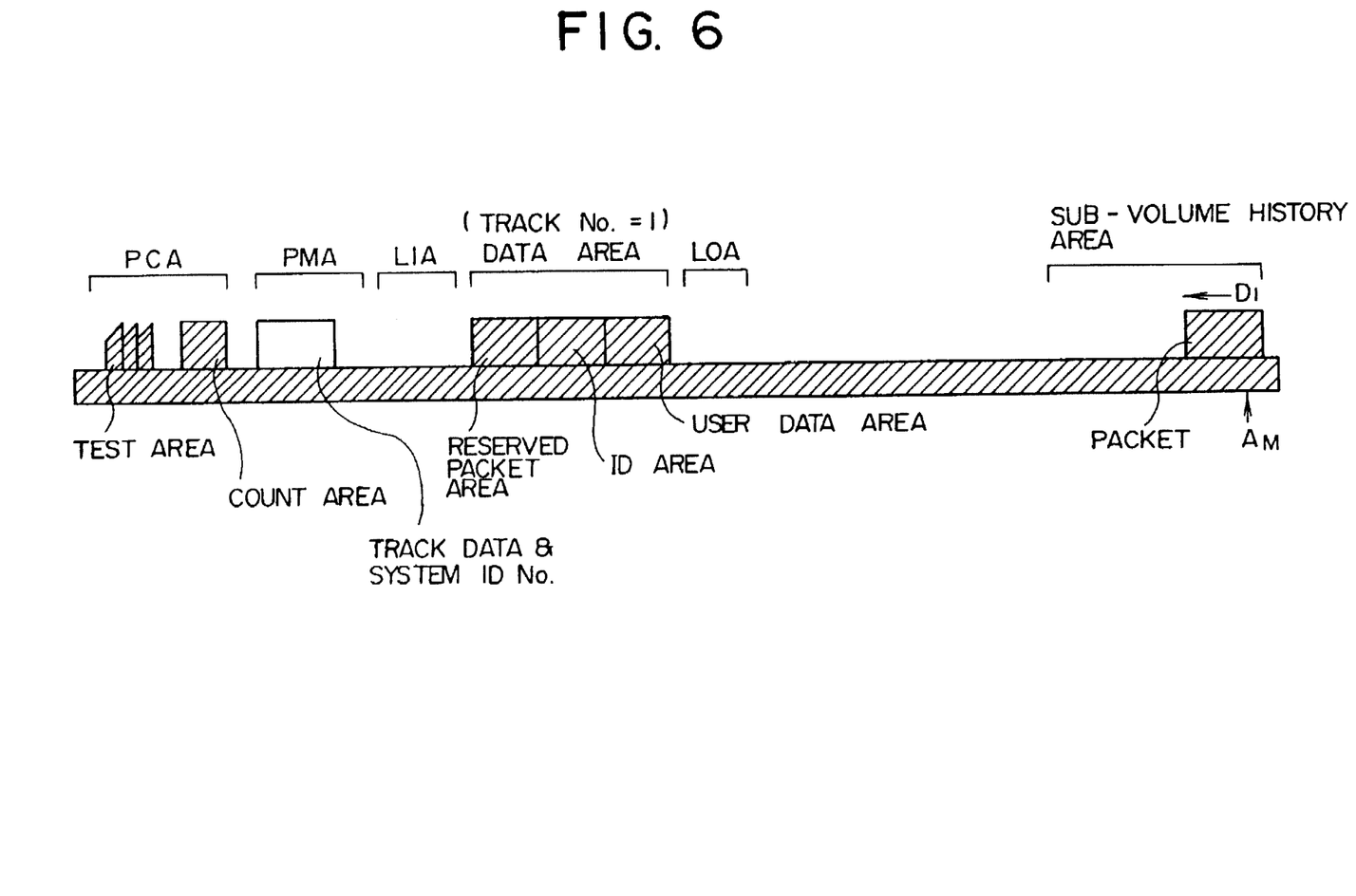
FIG. 6 explains how data is arranged on a disk according to a second variation.

FIG. 6 explains how data is arranged on a disk according to a second variation. According to the second variation, the sub-volume history (auxiliary volume history) having the same content as the volume history maintained on the host computer 13 according to the foregoing embodiment is written near the outermost area on the disk 21.

Information (file logical information, directory structure information and information relating to correspondence between directories and files) occurring or updated in the event of write, correction and deletion commands issued to the write system is written in a sub-volume history area as packets.

A capacity that corresponds to about 30 seconds exists between an outermost address of the start position of the LOA and the periphery. Accordingly, in order to take full advantage of the capacity of the disk 21, the outermost address (indicated by an arrow $A_M$ in FIG. 6) of the start position of the LOA is set to be a start position at which a first packet of the sub-volume history is written.

Packets that constitute the sub-volume history are written starting at the above-mentioned start position, toward the periphery. Packets that are appended are written toward the center with respect to the already written packets. Therefore, responsive to commands issued to the write system, packets are successively appended in the sub-volume history area such that a packet appended later is written further away from the periphery, that is nearer the center (as indicated by an arrow $D_1$ of FIG. 6), than the packets that are already appended. The aspects other than the writing of the sub-volume history on the disk 21 are the same as the aspects of the foregoing embodiment.

Since the sub-volume history is written on the disk 21 according to the second variation, it is possible to continue to write on the disk 21 based on the sub-volume history even if the volume history of the host computer 13 is lost due to some trouble. Finalization of the disk 21 can be carried out without any problem so that the reliability is significantly improved.

A description will now be given of a third variation of the write system. In the third variation, real-time access for writing on a CD-R disk is not conducted. An erasable medium such as a hard disk is used as a buffer when writing on the CD-R disk. A plurality of files written in the buffer within a predetermined period of time are written en bloc on the CD-R disk as one packet, the en bloc writing being conducted at predetermined intervals.

The third variation enables writing of a plurality of files as one packet on the CD-R disk. Therefore, the number of blocks at respective ends of the packets which blocks are not relevant to the user data can be reduced. Hence, the third variation is particularly suitable for a case in which a great number of files are processed.

For example, the third variation enables CD-R recording apparatus capable of random writing/reading to be used as a file server or a jukebox, for example, which are characterized by their capability to process a plurality of disks and a great number of files at the same time. In this way, the data area can be utilized more effectively.

The present invention is not limited to the above described embodiments, and variations and modifications may be made without departing from the scope of the present invention.

What is claimed is:

1. An optical disk write method for writing data on a write-once optical disk according to a predetermined format, using an optical disk recording apparatus, said optical disk write method comprising the steps of:

(a) reserving an area for logical format information on said optical disk before writing user data on said optical disk;

(b) writing variable-length packets, each packet comprising a demarcation block and a variable-length data block including a new file or a corrected file, on a data area on said optical disk, in response to a write instruction for writing the new file or the corrected file;

(c) maintaining, by the optical disk recording apparatus, volume history that comprises a set of first and second file logical information of recorded files and indicating a logical structure of files on said optical disk, and appending, to said volume history, first file logical information containing information relating to write positions of the new files or the corrected files written in response to the write instruction, and second file logical information provided for a file that is deleted in response to a delete instruction;

(d) generating logical format information of said optical disk on the basis of said volume history, in response to an instruction for finalizing said optical disk; and (e) finalizing said optical disk by writing said logical format information and data for a lead-in area and a lead-out area.

2. The optical disk write method as claimed in claim 1, wherein said step (c) includes the steps of maintaining files on said optical disk with reference to directories, and appending directory information to said volume history in response to a directory creation instruction, a directory correct instruction and a directory delete instruction.

3. The optical disk write method as claimed in claim 1, wherein said step (c) includes the steps of adding write data/time information to said first file logical information, second file logical information and directory information and appending the same to said volume history, and invalidating, in response to a reproduction instruction for instructing reproduction of the logical structure of the files at a certain point of time in the past, information added to said volume history after a specified point of time while maintaining information included in said volume history before the specified point of time as valid information.

4. The optical disk write method as claimed in claim 1, wherein said step (c) includes the steps of maintaining the volume history of each of a plurality of said optical disks, said optical disk write method further comprises the step of:

(f) writing, when said optical disk is initialized, a volume history identification code indicating the volume history corresponding to said specific optical disk on a predetermined area on said optical disk.

5. The optical disk write method as claimed in claim 1, further comprising the steps of:

(g) writing, in a program memory area, a system identification code specifying a type of write system and data indicating a zero capacity of the optical disk, when said optical disk is initialized, (h) determining that the specified type of write system is in the process of writing, when said system identification code and the data indicating a zero capacity of the optical disk are written in said program memory area.

6. The optical disk write method as claimed in claim 1, further comprising the steps of:

(i) comparing a period of time that elapsed since a last writing operation with a preset time;

(j) carrying out a calibration of a normal write power using a power calibration area, when it is found that the time that elapsed since the last writing operation is longer than the preset time;

(k) calculating, on the basis of a read signal derived from a file, an appropriate write power immediately after the file has been written with a write power previously set, and setting the appropriate write power as a current write power.

7. An optical disk write method for writing data on a write-once multi-session optical disk according to a predetermined format, using an optical disk recording apparatus, said optical disk write method comprising the steps of:

(a) reserving an area for logical format information of a session, on said optical disk before writing user data in said session;

(b) writing variable-length packets, each packet comprising a demarcation block and a variable-length data block including a new file or a corrected file, on a data area on said optical disk, in response to a write instruction for writing the new file or the corrected file;

(c) maintaining, by the optical disk recording apparatus, volume history that comprises a set of first and second file logical information of recorded files and indicating a logical structure of files on said optical disk, and appending, to said volume history, first file logical information containing information relating to write positions of the new files or the corrected files written in response to the write instruction, and second file logical information provided for a file deleted in response to a delete instruction;

(d) generating logical format-information of said session on the basis of said volume history, in response to an instructions for finalizing said session; and (e) finalizing said session by writing said logical format information and data for a lead-in area and a lead-out area.

8. The optical disk write method as claimed in claim 1, wherein an auxiliary volume history having the same content as said volume history is written as required on a predetermined area on said optical disk.

9. The optical disk write method as claimed in claim 1, wherein a buffer for writing files on said optical disk is provided in an erasable recording medium, and step (b) is executed such that, instead of writing files one by one on said optical disk, a plurality of files on said buffer, a packet built from a plurality of files written on said buffer is written at predetermined intervals on said optical disk.

* * * * *